(12) United States Patent
Omura et al.

(10) Patent No.: US 7,971,872 B2
(45) Date of Patent: Jul. 5, 2011

(54) DRIVE JOINT MECHANISM AND IMAGE FORMING APPARATUS USING THE SAME

(75) Inventors: Hiroyoshi Omura, Osaka (JP); Yasuhiko Sakaguchi, Osaka (JP)

(73) Assignee: Kyocera Mita Corporation (JP)

( * ) Notice: Subject to any disclaimer, the term of this patent is extended or adjusted under 35 U.S.C. 154(b) by 378 days.

(21) Appl. No.: 12/133,611

(22) Filed: Jun. 5, 2008

(65) Prior Publication Data

US 2008/0304865 A1    Dec. 11, 2008

(30) Foreign Application Priority Data

Jun. 8, 2007   (JP) .................................. 2007-152837

(51) Int. Cl.
*B65H 1/00*    (2006.01)
(52) U.S. Cl. ........................................ 271/162; 464/160
(58) Field of Classification Search .................. 271/162, 271/264; 464/160, 161
See application file for complete search history.

(56) References Cited

U.S. PATENT DOCUMENTS

| | | | | |
|---|---|---|---|---|
| 4,799,662 A * | 1/1989 | Sagara et al. | .................. | 271/114 |
| 5,149,079 A * | 9/1992 | Iwamoto et al. | .................. | 271/162 |
| 5,170,950 A * | 12/1992 | Okitsu et al. | .................. | 271/127 |
| 5,873,441 A * | 2/1999 | Tsujishita | .................. | 192/46 |
| 6,161,829 A * | 12/2000 | Kusumi | .................. | 271/9.05 |
| 6,361,038 B1 * | 3/2002 | Tada et al. | .................. | 271/111 |
| 6,725,004 B2 * | 4/2004 | Ahn et al. | .................. | 399/117 |
| 6,862,426 B2 * | 3/2005 | Kitamura | .................. | 399/393 |
| 7,503,558 B2 * | 3/2009 | Kusumi | .................. | 271/152 |
| 7,547,013 B2 * | 6/2009 | Matsumoto | .................. | 271/127 |
| 2002/0085858 A1 * | 7/2002 | Yamaguchi et al. | .................. | 399/167 |
| 2004/0256787 A1 * | 12/2004 | Wada et al. | .................. | 271/109 |
| 2005/0104273 A1 * | 5/2005 | Kim | .................. | 271/10.01 |
| 2005/0151314 A1 * | 7/2005 | Park | .................. | 271/121 |
| 2007/0001380 A1 * | 1/2007 | Kusumi | .................. | 271/157 |
| 2007/0102868 A1 * | 5/2007 | Matsumoto | .................. | 271/127 |

FOREIGN PATENT DOCUMENTS

| | | | |
|---|---|---|---|
| JP | 06173966 A | * | 6/1994 |
| JP | 11-43229 | | 2/1999 |
| JP | 2004051255 A | * | 2/2004 |

* cited by examiner

*Primary Examiner* — David H Bollinger
*Assistant Examiner* — Howard Sanders
(74) *Attorney, Agent, or Firm* — Gerald E. Hespos; Michael J. Porco

(57) ABSTRACT

A drive joint mechanism includes a drive shaft (30) and a driven shaft (24) coupled coaxially to the drive shaft (30). A coupling (31) on the drive shaft (30) or the driven shaft (24) has pin-engaging grooves (31a, 31b) and at least one pyramid-shaped pin-guide (32) between adjacent pin-engaging grooves (31a, 31b). An engagement pin (25) is provided on the other of the drive shaft (30) and the driven shaft (24) and engages the pin-engaging groove (31a, 31b). The engagement pin (25) contacts the pin-guide (32) while coupling the drive shaft (30) and the driven shaft (24). Thus, at least one of the drive shaft (30) and the driven shaft (24) is rotated by a pressing force exerted in the axial direction by the driven shaft (24) so that the pin-guide (32) guides the engagement pin (25) into the pin-engaging groove (31a, 31b).

12 Claims, 6 Drawing Sheets

DRIVE JOINT MECHANISM AND IMAGE FORMING APPARATUS USING THE SAME

BACKGROUND OF THE INVENTION

1. Field of the Invention

The present invention relates to a drive joint mechanism designed to couple a drive shaft and a driven shaft in coaxial relation to each other. The present invention also relates to an image forming apparatus using the drive joint mechanism.

2. Description of the Related Art

As a drive joint mechanism for an image forming apparatus, there has been known one type having a structure as shown in FIG. 6 (see, for example, JP 11-043229A: Patent Publication 1). The drive joint mechanism illustrated in FIG. 6 includes a coupling 101 mounted to a drive shaft 100 provided on the side of an apparatus main body of the image forming apparatus, and an engagement pin 103 mounted to a driven shaft 102 provided on the side of a sheet feed cassette which is inserted into the apparatus main body. In a process of assembling this drive joint mechanism, the engagement pin 103 is brought into contact with the coupling 101 in such a manner as to allow the engagement pin 103 to be engaged with an engagement groove 101a of the coupling 101.

With a view to allowing the engagement pin 103 to be engaged with the engagement groove 101a of the coupling 101, the drive joint mechanism disclosed in the Patent Publication 1 is designed such that the coupling 101 is mounted on the drive shaft 100 to be an axially slidably displaceable relative to the drive shaft 100, while being urged against the engagement pin 103 by a coil spring 105 so as to establish the engagement between the engagement pin 103 and the engagement groove 101a along with rotation of the drive shaft 100. This arrangement requires a space for permitting the slide displacement of the coupling 101, and thereby causes a problem about difficulty in facilitating a reduction in size of the drive joint mechanism. Moreover, the need for the coil spring 105 is a negative factor causing an increase in cost and deterioration in assembling efficiency of the drive joint mechanism.

SUMMARY OF THE INVENTION

In view of the above problems in the conventional mechanism, it is an object of the present invention to provide a drive joint mechanism, particularly, for an image forming apparatus, capable of facilitating a reduction in size thereof while achieving lower cost and enhanced assembling efficiency.

In order to achieve this object, the present invention provides a drive joint mechanism which includes a drive shaft, a driven shaft arranged to be coupled to the drive shaft in coaxial relation thereto, a coupling provided on one of the drive shaft and the driven shaft and having a plurality of pin-engaging grooves formed in a circumferential direction of the coupling and at least one pyramid-shaped pin-guiding portion formed between the adjacent pin-engaging grooves, and an engagement pin provided on the remaining one of the drive shaft and the driven shaft and engageable with the pin-engaging groove. Each of the coupling and the engagement pin is fixed at a given position in an axially non-displaceable manner relative to the respective one of the drive shaft and the driven shaft. When the engagement pin is brought into contact with the pin-guiding portion during an operation of coupling the drive shaft and the driven shaft, at least one of the drive shaft and the driven shaft is rotated by a pressing force exerted in the axial direction by the driven shaft so as to allow the engagement pin to be guided into the pin-engaging groove by the pin-guiding portion.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

The present invention will now be specifically described.

Figure 1:
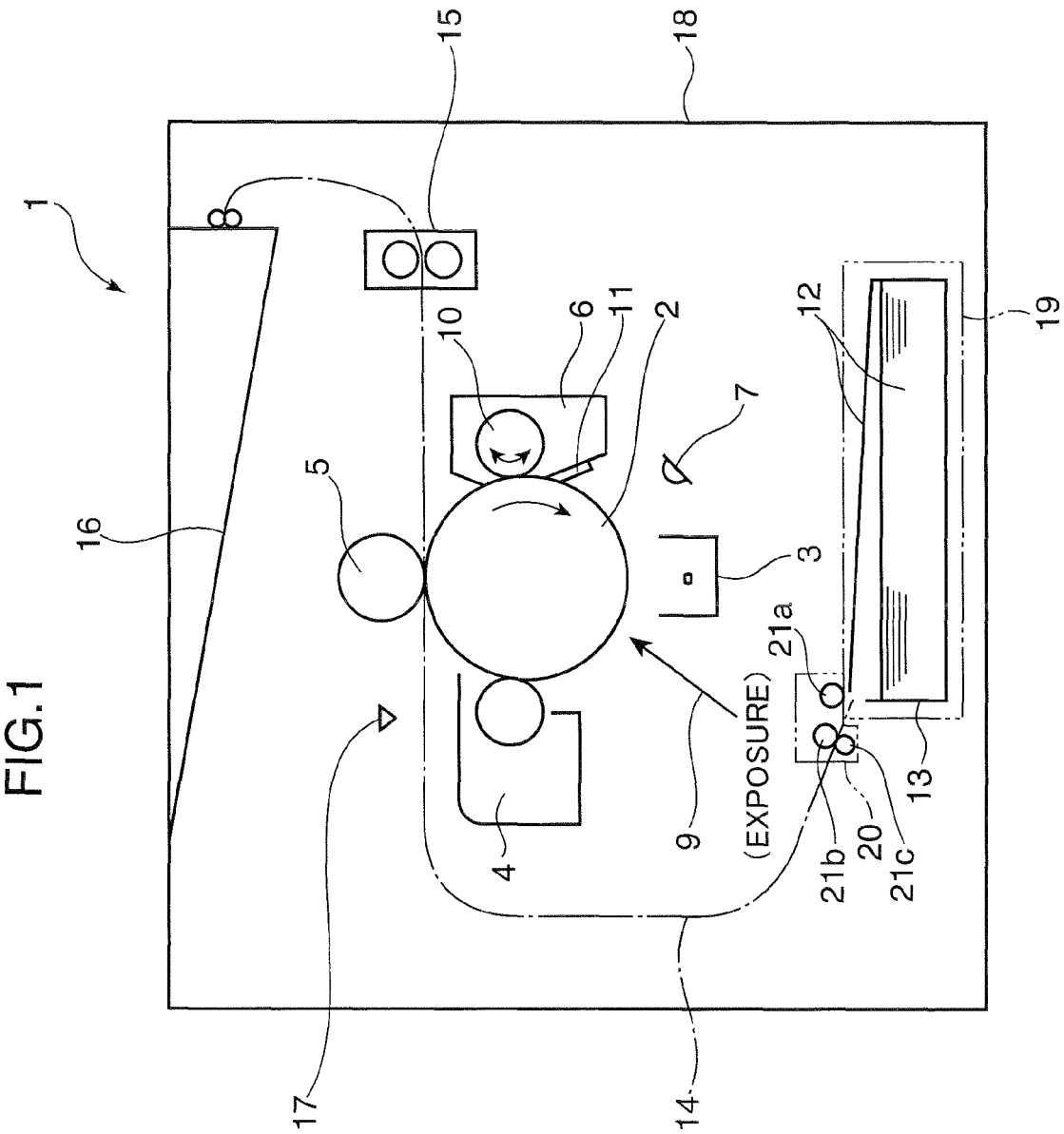
FIG. 1 is a front view showing one example of an image forming apparatus using a drive joint mechanism according to one embodiment of the present invention.

FIG. 1 is a front view showing one example of an image forming apparatus using a drive joint mechanism according to one embodiment of the present invention.

This image forming apparatus 1 includes an apparatus main body 18 which is internally provided with an image forming section including a generally columnar-shaped photosensitive drum 2 having an outer peripheral surface made of amorphous silicon and serving as an image carrier. The image forming section also includes a charger unit 3, a development unit 4, a transfer roller 5, a cleaning unit 6 and a charge eliminator 7, which are disposed around the photosensitive drum 2 in a rotation direction of the photosensitive drum 2. The image forming section further includes a fixing unit 15. The cleaning unit 6 includes a polishing roller 10 disposed on an upstream side in the rotation direction of the photosensitive drum 2, and a cleaning blade 11 disposed on a downstream side relative to the polishing roller 10.

In the image forming apparatus 1, an image forming operation is performed as follows. The charger unit 3 is operable to electrostatically charge the outer peripheral surface of the photosensitive drum 2 in a uniform manner, and then an exposure process is performed by irradiating the outer peripheral surface of the photosensitive drum 2 with a laser beam 9 according to image data. Through the exposure process, an electrostatic latent image is formed on the outer peripheral surface of the photosensitive drum 2. Then, the development unit 4 is operable to develop the electrostatic latent image so as to form a toner image. Then, the transfer roller 5 is operable to transfer the toner image on the outer peripheral surface of the photosensitive drum 2 onto a transfer medium, e.g., a recording sheet 12. During this transfer process, a transfer bias is applied between the photosensitive drum 2 and the transfer roller 5 to electrostatically charge a toner of the toner image so as to allow the toner to be smoothly transferred onto the recording sheet 12.

After the transfer process, the polishing roller 10 is operable to polish the outer peripheral surface of the photosensitive drum 2 so as to allow toner remaining on the photosensitive drum 2 to be attached thereto. Further, the cleaning blade 11 is operable to collect the toner attached to the polishing roller 10. Then, the charge eliminator 7 is operable to remove residual potential on the photosensitive drum 2. Subsequently, the photosensitive drum 2 is electrostatically charged again by the charge unit 3 to repeatedly perform the above image forming operation.

The apparatus main body 18 is internally provided with a transport passage 14 along which the recording sheet 12 is transported. Specifically, the recording sheet 12 picked up from a sheet cassette 13 is transported along the transport passage 14, and sent to a position between the photosensitive drum 2 and the transfer roller 5. When the recording sheet 12 passes through therebetween, the toner image on the photosensitive drum 2 is transferred onto the recording sheet 12 by an action of the transfer roller 5. Then, the recording sheet 12 is ejected onto a catch tray 16 after the image is fixed on the recording sheet 12 by the fixing unit 15. A registration sensor 17 is disposed on an upstream side of the transfer roller 5 along the transport passage 14. Based on an on/off signal from the registration sensor 17, opposite edges of the recording sheet 12 in a transport direction are detected to perform, for example, a registration between the recording sheet 12 and the toner image on the photosensitive drum 2.

The apparatus main body 18 has a lower portion provided with a cassette housing 19 adapted to allow the sheet cassette 13 to be detachably received therein, and a sheet feed unit 20 adjacent to the cassette housing 19. The sheet feed unit 20 serves as a unit which is mounted in the apparatus main body 18, and includes a pickup roller 21a, a sheet feed roller 21b and a separation roller 21c. The pickup roller 21a is disposed above the sheet cassette 13 set up in the cassette housing 19, and adapted to pick up a topmost one of a stack of recording sheets 12 stored in the sheet cassette 13. The sheet feed roller 21b is adapted to feed the recording sheet 12, picked up by the pickup roller 21a, to the transport passage 14. The separation roller 21c is disposed in opposed relation to the sheet feed roller 21b across the transport passage 14, and adapted, when two recording sheets are picked up in a superimposed manner by the pickup roller 21a, to separate one of the two recording sheets 12 from the remaining recording sheet 12 by rotating in the same direction as the sheet feed roller 21b. The pickup roller 21a, the sheet feed roller 21b and the separation roller 21c are disposed in such a manner that respective axes extend in the same direction.

The sheet cassette 13 is a container having an open upper end. A topmost one of the stack of recording sheets 12 stored in the container 13 is picked up by the sheet feed unit 20 in sequence, and transported along the transport passage 14.

Figure 2:
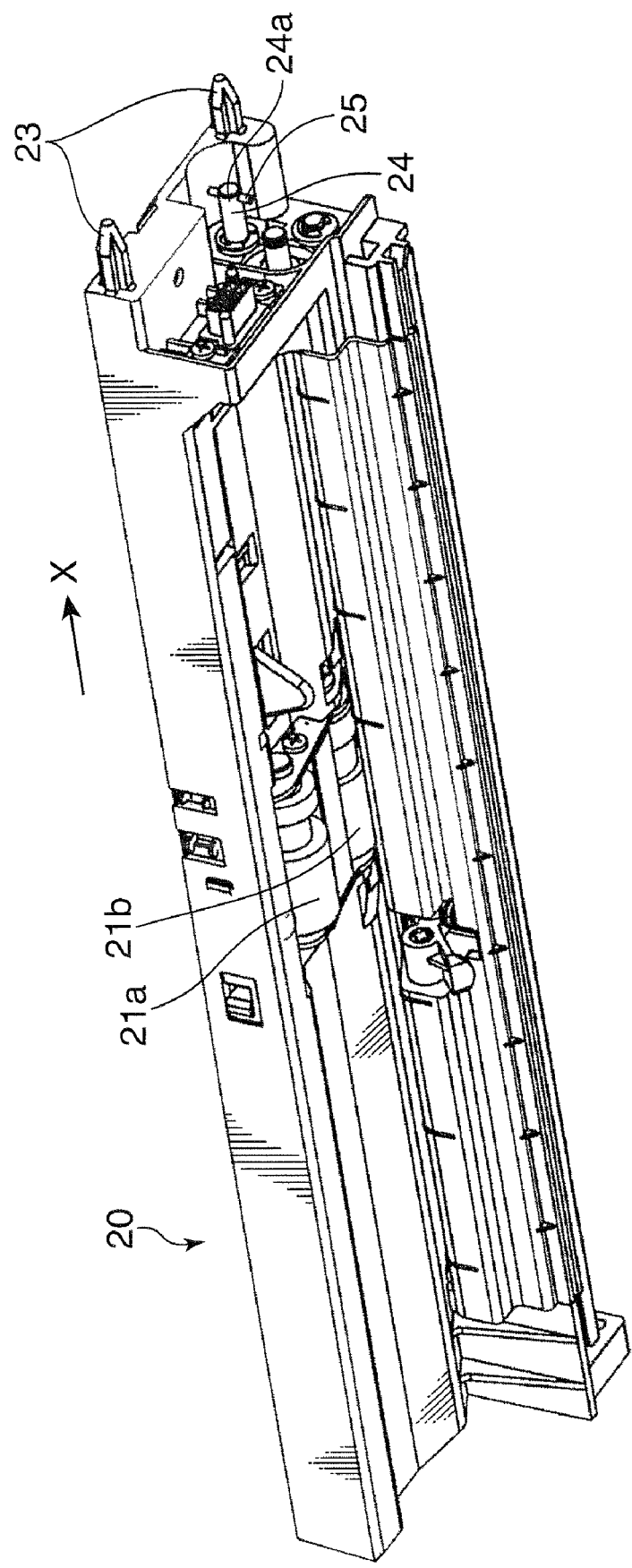
FIG. 2 is an external perspective view showing a sheet feed unit of the image forming apparatus, when viewed from diagonally below.
Figure 3:
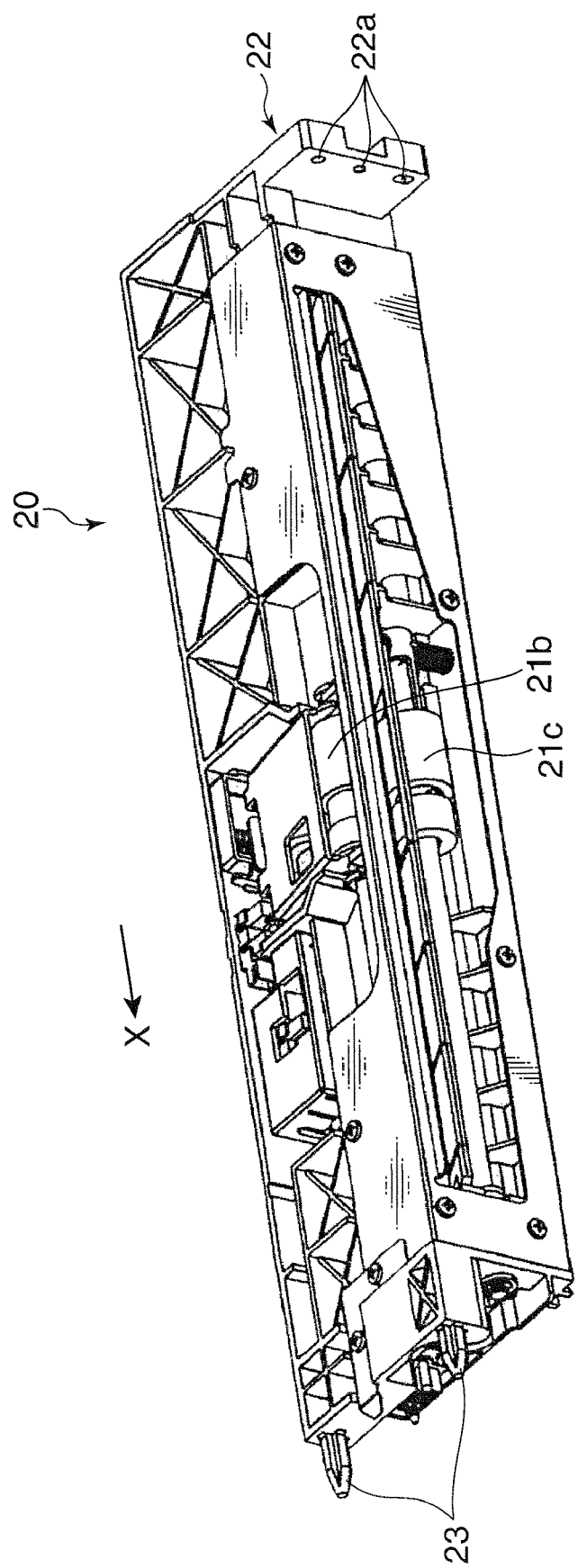
FIG. 3 is an external perspective view showing the sheet feed unit, when viewed from diagonally above.

FIG. 2 is an external perspective view of the sheet feed unit 20, when viewed from diagonally below, and FIG. 3 is an external perspective view of the sheet feed unit 20, when viewed from diagonally above.

The sheet feed unit 20 is mounted to the cassette housing 19 by inserting it into an inner space of the apparatus main body 18 in the vicinity of the cassette housing 19 in an X direction, i.e., an axial direction of the sheet feed roller 21b, and fixing to the cassette housing 19 an attaching portion 22 of the sheet feed unit 20 provided at one end (i.e., front end) thereof opposite to the other end (i.e., rear end) thereof which is first inserted into the inner space of the apparatus main body 18 in the vicinity of the cassette housing 19. More specifically, in the illustrated example, the attaching portion 22 is formed with three mounting holes 22a, and the sheet feed unit 20 is mounted to the cassette housing 19 by inserting a screw (not shown) into each of the mounting holes 22a and then screwing the screw into the cassette housing 19.

The rear end of the sheet feed unit 20 in the X direction is provided with a pair of positioning pins 23 and a driven shaft 24 is rotatably arranged in the sheet feed unit 20 with one end 24a exposed outside of the sheet feed unit 20. The positioning pins 23 are adapted to be fitted into respective ones of a pair of positioning concave portions (not shown) provided in the cassette housing 19 so as to set a mounting position and a mounting angle of the sheet feed unit 20 with respect to the cassette housing 19.

The driven shaft 24 is formed as a shaft of the sheet feed roller 21b, and designed to receive torque from an aftermentioned drive shaft 30 so as to rotate the sheet feed roller 21b and further rotate the pickup roller 21a and the separation roller 21c in respective desired directions through a gear (not shown) or the like. The driven shaft 24 may be a shaft of the pickup roller 21a or the separation roller 21c, or may be a shaft which is provided separately from the respective shafts of the rollers 21a, 21b, 21c and is adapted to transmit a rotational power to each of the rollers 21a, 21b, 21c through a gear (not shown) or the like.

The end 24a of the driven shaft 24 is provided with an engagement pin 25. For example, the engagement pin 25 has a circular shape in section and has opposite ends protruding in opposite directions from an outer peripheral surface of the driven shaft 24. The engagement pin 25 is thus in the form of a straight bar. The engagement pin 25 may be formed separately from the driven shaft 24, and in this case two pins are fixed on the outer peripheral surface of the driven shaft 24 to protrude in respective opposite directions.

Figure 4:
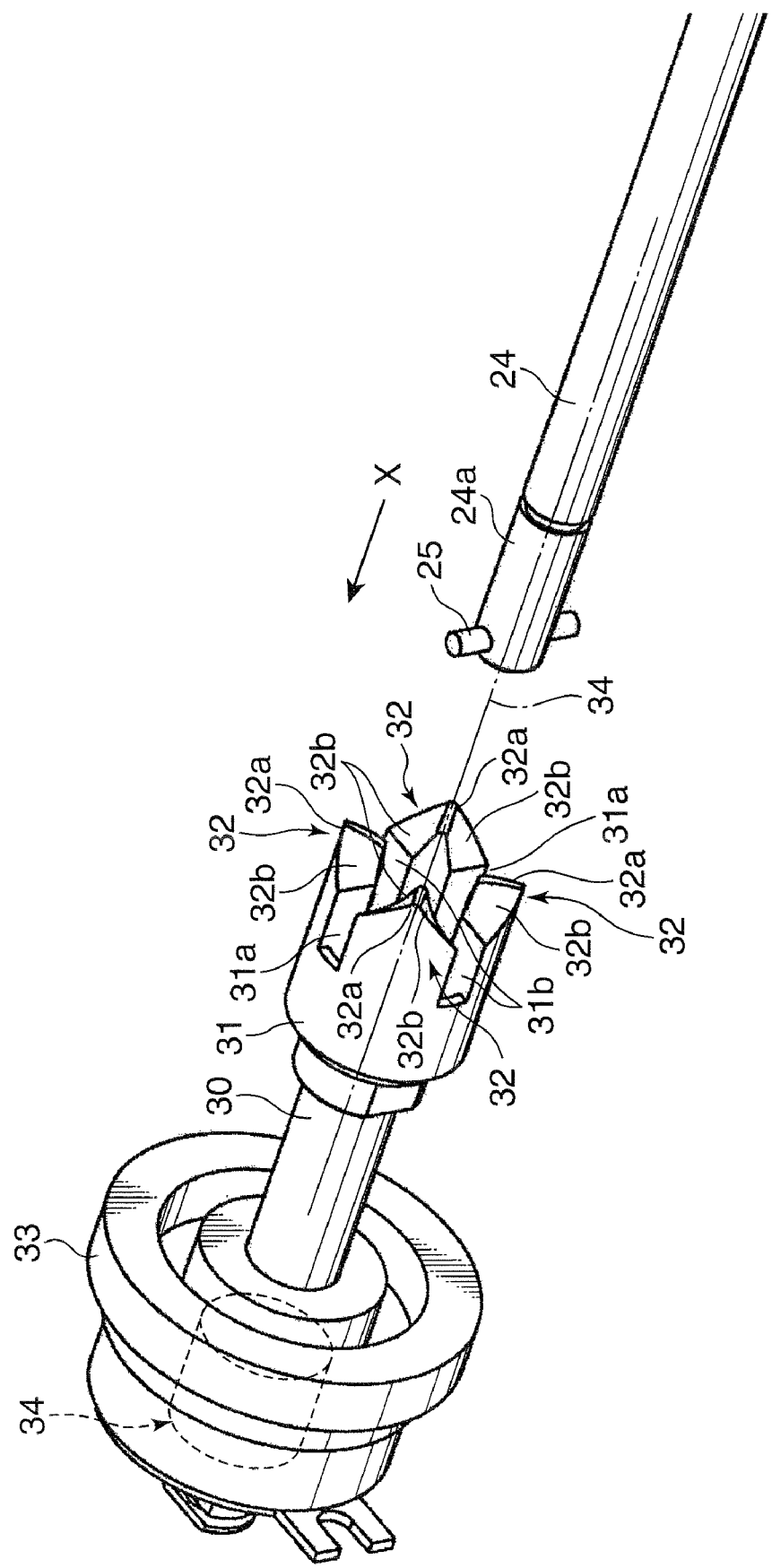
FIG. 4 is a perspective view showing the drive joint mechanism according to the embodiment.

FIG. 4 is a perspective view showing the drive joint mechanism according to this embodiment.

The drive joint mechanism is designed to couple a drive shaft 30 and the driven shaft 24 in coaxial relation to each other (that is, respective axes of the drive shaft 30 and the driven shaft 24 aligned) so as to transmit a driving force generated in the apparatus main body 18 to the sheet feed unit 20 serving as the mounted unit. The drive joint mechanism includes the engagement pin 25 provided on the driven shaft 24 and a coupling 31 provided on the drive shaft 30.

The drive shaft 30 is provided at an appropriate position in the apparatus main body 18. The drive shaft 30 has a distal end provided with the coupling 31 and a base end provided with a rotation transmission member 33. The coupling 31 is fixed at a given position on the drive shaft 30 in an axially non-displaceable manner relative to the drive shaft 30. In the same way, the engagement pin 25 is fixed at a given position on the driven shaft 24 in an axially non-displaceable manner relative to the driven shaft 24.

The coupling 31 has a plurality of pin-engaging grooves (in the illustrated embodiment, two pairs of pin-engaging grooves 31a, 31b) which are formed along a circumferential direction thereof at even intervals. Two pairs of pin-engaging grooves 31a, 31b are so arranged in the form of a cross-like groove as to receive the straight bar-like engagement pin 25. The coupling 31 further has four pin-guiding portions 32 each formed between adjacent ones of the four pin-engaging grooves 31a, 31b. Each of the pin-guiding portions 32 is formed in a pyramid shape or a spire shape which protrudes outwardly in an axis direction, and has a pointed top end 32a and a pair of inclined parts 32b that are formed on respective opposite sides of the top end 32a to inclinedly extend from the top end 32a. Each of the inclined parts 23b is formed as an inclined surface capable of guiding the engagement pin 25 into one of the two pin-engaging groove pairs 31a, 31b, as will be described later. The coupling 31 is arranged on a rear side of (i.e., behind) the sheet feed unit 20 fixed to the cassette housing 19, in such a manner that the pin-engaging groove pairs 31a, 31b and the pin-guiding portions 32 are oriented frontwardly.

The rotation transmission member 33 is designed to rotate the drive shaft 30 based on torque transmitted from a motor (not shown) serving as a rotational driving source. For example, the rotation transmission unit 33 has a belt wound around between an outer peripheral surface thereof and a rotary shaft of the motor, or has a gear which is formed on the outer peripheral surface and meshed with a gearwheel fixed to the rotary shaft of the motor. The base end of the drive shaft 30 is disposed inside the rotation transmission member 33 in coaxial relation with the rotation transmission member 33, and is provided with an electromagnetic clutch 34 adapted to be selectively switched between a transmission mode where torque from the rotary shaft of the motor is transmitted to the drive shaft 30, and a release mode where the transmission mode is released.

An operation of fixedly mounting the sheet feed unit 20 to the cassette housing 10 of the apparatus main body 18 of the image forming apparatus 1 will be described below.

Firstly, the electromagnetic clutch 34 is set in the release mode to preclude a torque transmission from the rotary shaft of the motor to the drive shaft 30. That is, the drive shaft 30 is placed in a freely rotatable state.

Figure 5:
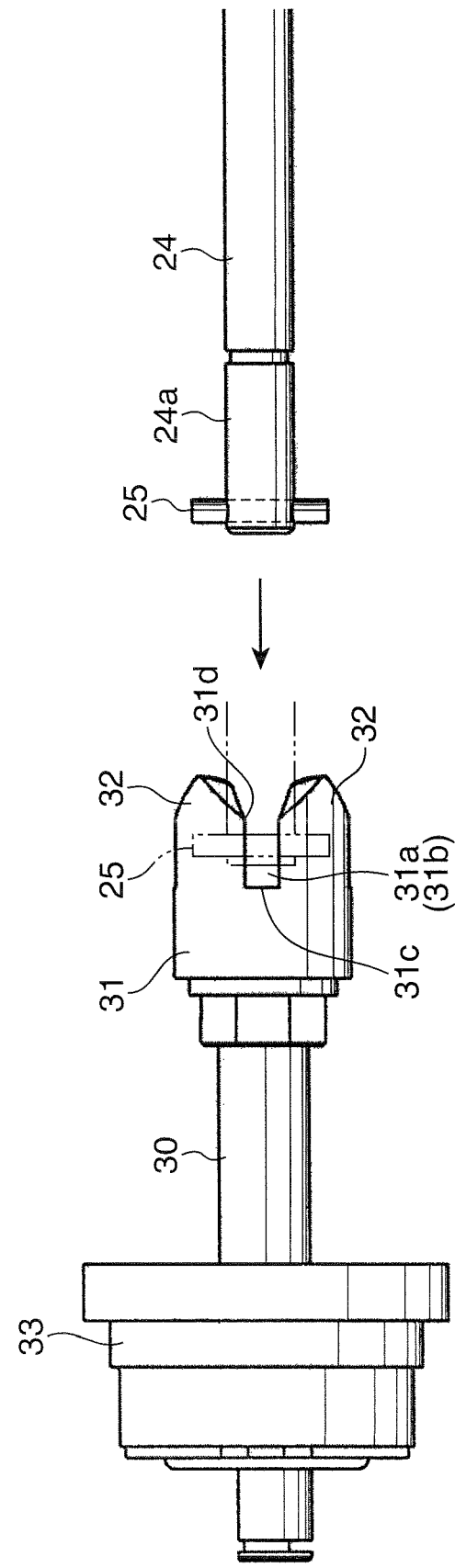
FIG. 5 is an explanatory diagram showing pin-engaging grooves of a coupling and an engagement pin of the drive joint mechanism.
Figure 6:
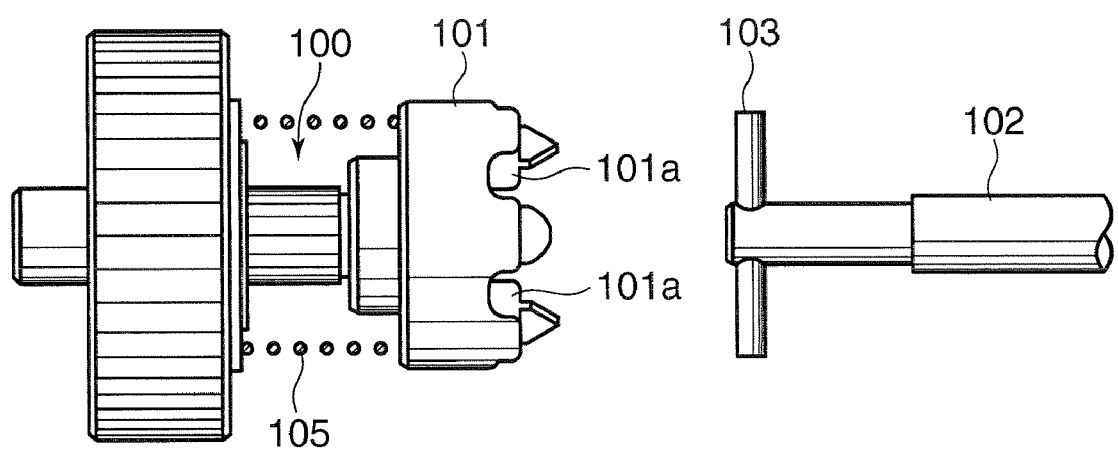
FIG. 6 is an explanatory diagram showing the conventional drive joint mechanism.

Then, the sheet feed unit 20 is inserted into the inner space of the apparatus main body 18 in the vicinity of the cassette housing 19. In the insertion operation, firstly, the engagement pin 25 is oriented toward the cassette housing 19, and the driven shaft 24 is visually positioned to be approximately axially aligned with the drive shaft 30, as shown in FIG. 5.

Then, the positioning pins 23 of the sheet feed unit 20 are positioned relative to the respective positioning concave portions (not shown) of the cassette housing 19. In this positioning operation, if the engagement pin 25 is received in one of the pin-guiding groove pairs 31a, 31b of the coupling 31, the sheet feed unit 20 is further inserted into the inner space of the apparatus main body 18 to allow the positioning pins 23 to be reliably fitted into the respective positioning concave portions. On the other hand, even if the engagement pin 25 is not received in one of the pin-guiding groove pairs 31a, 31b of the coupling 31, i.e., the engagement pin 25 is in contact with the pin-guiding portions 32, at least one of the drive shaft 30 placed in the freely rotatable state, and the driven shaft 24 capable of being rotated even by a relatively small force, is rotated according to a pressing force of the driven shaft 24 applied to the two pin-guiding portions 32 in an axial direction (i.e., in an axial direction of the drive shaft 30 and the driven shaft 24) during the insertion of the sheet feed unit 20, to allow the engagement pin 25 to be guided by the inclined parts 32b in the pin-guiding portions 32 and fitted into the pin-engaging groove pair 31a (or 31b), so as to establish engagement between the coupling 31 and the engagement pin 25.

Then, the sheet feed unit 20 is inserted deeper into the inner space of the apparatus main body 18 in the vicinity of the cassette housing 19 to allow the positioning pins 23 to be fully fitted into the respective positioning concave portions. Through the positioning operation, the mounting position and the mounting angle of the sheet feed unit 20 are adjusted with respect to the apparatus main body 18.

Then, a screw (not shown) is inserted into each of the mounting holes 22a of the attaching portion 22, and screwed into a given mounting portion of the cassette housing 19. Through this screwing operation, the sheet feed unit 20 is mounted to the cassette housing 19. As shown in FIG. 5, the drive joint mechanism is designed such that, in the mounted state, the engagement pin 25 is positioned in spaced-apart relation to a groove bottom 31c of the pin-guiding groove pair 31a (or 31b), as indicated by the two-dot chain line.

Subsequently, the electromagnetic clutch 34 is set in the transmission mode to transmit torque from the rotary shaft of the motor to the drive shaft 30, so that the drive shaft 30 and the driven shaft 24 are rotated. Thus, each of the rollers 21a, 21b, 21c is rotated in a given direction to allow the recording sheets 12 in the sheet cassette 13 to be picked up in sequence.

In this embodiment, each of the pin-guiding portions 32 has a pyramid shape. Thus, even if the engagement pin 25 is brought into contact with the pin-guiding portion 32 during the operation of mounting the sheet feed unit 20 to the apparatus main body 18, at least one of the drive shaft 30 and the driven shaft 24 is rotated according to the pressing force of the driven shaft 24 axially applied to the pin-guiding portion 32 to allow the engagement pin 25 to be guided into one of the pin-engaging groove pairs 31a, 31b by the pin-guiding portion 32, so as to establish engagement between the coupling 31 and the engagement pin 25. Thus, in this embodiment, it is not necessary to design the coupling 31 such that it can be displaceable in a direction in which the sheet feed unit 20 is inserted into the inner space of the apparatus main body 18 in the vicinity of the cassette housing 19, as in the conventional drive joint mechanism. This makes it possible to omit a space which is otherwise required for the displacement of the coupling in the conventional drive joint mechanism, so as to facilitate a reduction in size of the drive joint mechanism. In addition, a spring which is required for the displacement of the coupling in the conventional drive joint mechanism can be omitted to facilitate a reduction in cost and enhancement in assembling efficiency of the drive joint mechanism.

In this embodiment, when the electromagnetic clutch 34 is set in the release mode, the drive shaft 30 is placed in the freely rotatable state. Thus, the drive shaft 30 which is otherwise rotated only by the amount of backlash can be rotated by a relatively small force, as well as the driven shaft 24 capable of being rotated by a relatively small force. This makes it possible to establish the engagement between the coupling 31 and the engagement pin 25 in a reliable and easy manner.

While the coupling 31 in the above embodiment is provided with two pairs of pin-engaging grooves 31a, 31b, the drive joint mechanism of the present invention is not limited to this structure, but the coupling 31 may be provided with a single pair or three or more pairs of pin-engaging grooves.

In the above embodiment, the coupling 31 and the engagement pin 25 are provided to the drive shaft 30 and the driven shaft 24, respectively. Alternatively, contrariwise, the engagement pin 25 and the coupling 31 may be provided to the drive shaft 30 and the driven shaft 24, respectively.

While the above embodiment has been described based on an example where the sheet feed unit 20 is mounted to the apparatus main body 18 to allow the driven shaft provided in the sheet feed unit to be coupled to the drive shaft provided in the apparatus main body, the drive joint mechanism of the present invention is not limited to this structure. For example, the drive joint mechanism of the present invention may also be used for coupling a driven shaft of a transport roller provided in the transport passage 14, a development roller provided in the development unit 4, or the polishing roller 10, to the drive roller provided in the apparatus main body 18.

The above drive joint mechanism primarily includes the following features.

The drive joint mechanism according to the above embodiment includes a drive shaft, a driven shaft arranged to be coupled to the drive shaft in coaxial relation thereto, a coupling provided on one of the drive shaft and the driven shaft and having a plurality of pin-engaging grooves formed in a circumferential direction of the coupling and at least one pyramid-shaped pin-guiding portion formed between the adjacent pin-engaging grooves, and an engagement pin provided on the remaining one of the drive shaft and the driven shaft and engageable with the pin-engaging groove. Each of the coupling and the engagement pin is fixed at a given position in an axially non-displaceable manner relative to the respective one of the drive shaft and the driven shaft. When the engagement pin is brought into contact with the pin-guiding portion during an operation of coupling the drive shaft and the driven shaft, at least one of the drive shaft and the driven shaft is rotated by a pressing force exerted in the axial direction by the driven shaft so as to allow the engagement pin to be guided into the pin-engaging groove by the pin-guiding portion.

In the above drive joint mechanism, the pin-guiding portion has a pyramid shape. Thus, at least one of the drive shaft and the driven shaft can be rotated by a pressing force of the driven shaft axially applied to the pin-guiding portion, to allow the engagement pin to be guided into at least one of the pin-engaging grooves by the pin-guiding portion, so as to establish engagement between the coupling and the engagement pin. In this drive joint mechanism, it is not necessary for the coupling 31 to have a displaceable structure as in the conventional drive joint mechanism. This makes it possible to omit a space which is otherwise required for the displacement of the coupling in the conventional drive joint mechanism, so as to facilitate a reduction in size of the drive joint mechanism. In addition, a spring required for the conventional drive joint mechanism can be omitted to facilitate a reduction in cost and enhancement in assembling efficiency of the drive joint mechanism.

In the above drive joint mechanism, the drive shaft is provided with an electromagnetic clutch that can be selectively switched between a transmission mode where torque is transmitted to the drive shaft and a release mode where the transmission mode is released. According to this feature, when the electromagnetic clutch is set in the release mode, the drive shaft can be rotated by a relatively small force. This makes it possible to establish the engagement between the coupling and the engagement pin in a reliable and easy manner.

In the above drive joint mechanism, the pin-guiding portion has a top end and a pair of inclined parts that is formed on respective opposite sides of the top end to inclinedly extend from the top end. Each of the inclined parts is formed as an inclined surface capable of guiding the engagement pin into the pin-engaging groove. According to this feature, the engagement pin can be smoothly engaged with the pin-engaging groove.

In the above drive joint mechanism, at least one of the drive shaft and the driven shaft is allowed to be rotated when the engagement pin is brought into contact with the top end of the pin-guiding portion and guided by the inclined part. According to this feature, at least one of the drive shaft and the driven shaft can be rotated to establish the engagement between the coupling and the engagement pin in a reliable and easy manner.

In the above drive joint mechanism, the engagement pin has opposite ends protruding in opposite directions from an outer peripheral surface of the respective one of the drive shaft and the driven shaft, and the pin-engaging grooves are formed at even intervals. In this case, the engagement pin may have a straight bar-like shape and the pin-engaging grooves may be so arranged in the form of a cross-like groove as to receive the straight bar-like engagement pin. According to this feature, the engagement between the engagement pin and the pin-engaging groove can be established in an easy manner.

This application is based on Japanese Patent Application No. 2007-152837 filed in Japan Patent Office on Jun. 8, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A drive joint mechanism comprising:
a drive shaft;
a driven shaft arranged to be coupled to the drive shaft in coaxial relation thereto;
a coupling fixed on the drive shaft for integral rotation therewith, and having a plurality of pin-engaging grooves formed in a circumferential direction of the coupling and at least one pyramid-shaped pin-guiding portion formed between the adjacent pin-engaging grooves;
an engagement pin provided on the driven shaft and engageable with the pin-engaging groove;
a switching device switched selectively between a transmission mode where torque is transmitted to the drive shaft and a release mode where the transmission mode is released;
a support member rotatably supporting the driven shaft;
wherein each of the coupling and the engagement pin is fixed at a given position in an axially non-displaceable manner relative to the respective one of the drive shaft and the driven shaft;
the switching device is switched to the release mode from the transmission mode in a non-coupling state where the driven shaft is not coupled to the drive shaft;
the drive shaft is rotatable in the release mode;
the driven shaft is rotatable in the non-coupling state while being supported by the support member; and
when the engagement pin is brought into contact with the pin-guiding portion during an operation of coupling the drive shaft and the driven shaft, at least one of the drive shaft and the driven shaft is rotated by a pressing force exerted in the axial direction by the driven shaft so as to allow the engagement pin to be guided into the pin-engaging groove by the pin-guiding portion.

2. The drive joint mechanism as defined in claim 1, wherein the switching device is an electromagnetic clutch provided on the drive shaft.

3. The drive joint mechanism as defined in claim 1, wherein the pin-guiding portion has a top end and a pair of inclined parts that are formed on respective opposite sides of the top end to inclinedly extend from the top end, each of the inclined parts being formed as an inclined surface capable of guiding the engagement pin into the pin-engaging groove.

4. The drive joint mechanism as defined in claim 3, wherein at least one of the drive shaft and the driven shaft is allowed to be rotated when the engagement pin is brought into contact with the top end of the pin-guiding portion and guided by the inclined part.

5. The drive joint mechanism as defined in claim 1, wherein the engagement pin has opposite ends protruding in opposite directions from an outer peripheral surface of the driven shaft; and
   wherein the pin-engaging grooves are formed at even intervals.

6. The drive joint mechanism as defined in claim 5, wherein the engagement pin has a straight bar-like shape and the pin-engaging grooves are so arranged in the form of a cross-like groove as to receive the straight bar-like engagement pin.

7. An image forming apparatus comprising:
   an apparatus main body including an image forming section operable to form an image on a sheet;
   a sheet feed unit detachably mounted in the apparatus main body and having a roller member and a support member rotatably supporting the roller member, the sheet feed unit feeding the sheet to the image forming section by the rotation of the roller member;
   a drive joint mechanism operable to transmit a driving force generated in the apparatus main body to the sheet feed unit;
   the drive joint mechanism including:
      a drive shaft provided in the apparatus main body;
      a driven shaft provided in the sheet feed unit and arranged to be coupled to the drive shaft in coaxial relation thereto;
      a coupling fixed on the drive shaft for integral rotation therewith, and having a plurality of pin-engaging grooves formed in a circumferential direction of the coupling and at least one pyramid-shaped pin-guiding portion formed between the adjacent pin-engaging grooves;
      an engagement pin provided on the driven shaft and engageable with the pin-engaging groove;
      a switching device selectively switching between a transmission mode where torque is transmitted to the drive shaft and a release mode where the transmission mode is released;
      wherein each of the coupling and the engagement pin is fixed at a given position in an axially non-displaceable manner relative to the respective one of the drive shaft and the driven shaft;
      the switching device switches to the release mode from the transmission mode in a non-coupling state where the driven shaft is not coupled to the drive shaft;
      the drive shaft is rotatable in the release mode;
      the driven shaft is a shaft of the roller member of the sheet feed unit and is rotatable in the non-coupling state while being supported by the support member; and
      when the engagement pin is brought into contact with the pin-guiding portion during an operation of coupling the drive shaft and the driven shaft the drive shaft is rotated by a pressing force exerted in the axial direction by the driven shaft so as to allow the engagement pin to be guided into the pin-engaging groove by the pin-guiding portion.

8. The image forming apparatus as defined in claim 7, wherein the switching device is an electromagnetic clutch provided on the drive shaft.

9. The image forming apparatus as defined in claim 7, wherein the pin-guiding portion has a top end and a pair of inclined parts that are formed on respective opposite sides of the top end to inclinedly extend from the top end, each of the inclined parts being formed as an inclined surface capable of guiding the engagement pin into the pin-engaging groove.

10. The image forming apparatus as defined in claim 9, wherein at least one of the drive shaft and the driven shaft is allowed to be rotated when the engagement pin is brought into contact with the top end of the pin-guiding portion and guided by the inclined part.

11. The image forming apparatus as defined in claim 7, wherein the engagement pin has opposite ends protruding in opposite directions from an outer peripheral surface of the driven shaft; and
    wherein the pin-engaging grooves are formed at even intervals.

12. The image forming apparatus as defined in claim 11, wherein the engagement pin has a straight bar-like shape and the pin-engaging grooves are so arranged in the form of a cross-like groove as to receive the straight bar-like engagement pin.

* * * * *